Patented Jan. 1, 1946

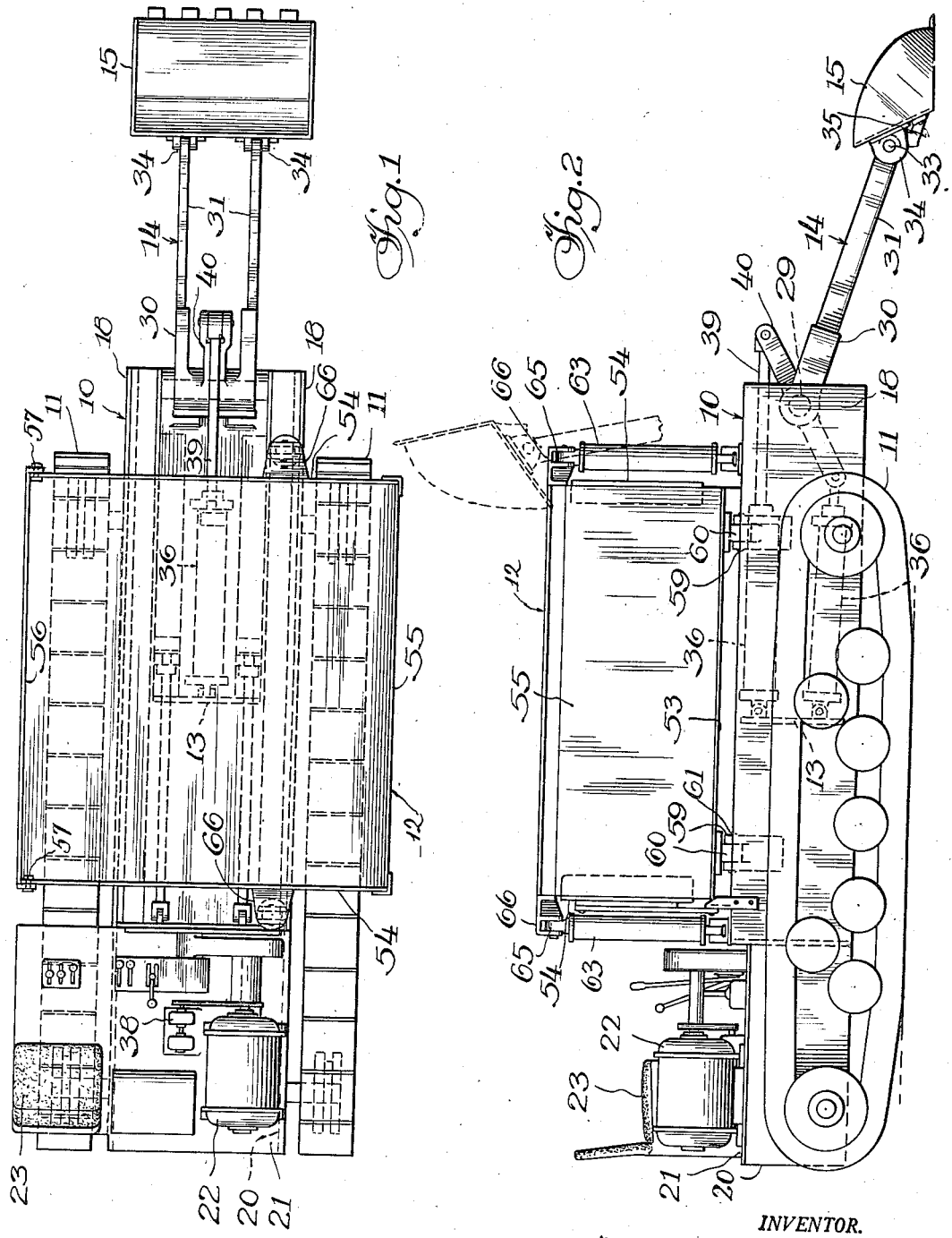

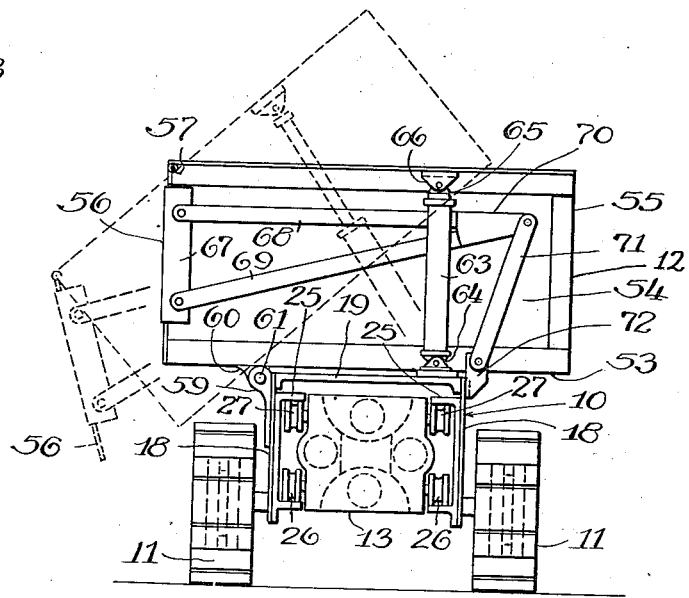

2,392,025

UNITED STATES PATENT OFFICE 2,392,025

SELF-LOADING VEHICLE

Ernest Craig, Falconbridge, Ontario, Canada, assignor to Goodman Manufacturing Company, Chicago, Ill., a corporation of Illinois Application March 18, 1944, Serial No. 527,039

4 Claims. (Cl. 214—78)

This invention relates to improvements in self-loading vehicles of the type particularly adapted to load and transport ore in mines underground.

The principal objects of my invention are to provide a novel and simplified form of self-loading and unloading vehicle including a material carrying self-dumping body, a scoop on the end of a boom, for loading material into said body, and a novel and efficient form of mechanism for crowding the scoop into the material it is desired to load independently of movement of the vehicle and for swinging the scoop and boom upwardly for discharge into the material carrying body of the vehicle.

Other objects of my invention will appear from time to time as the following specification proceeds and with reference to the accompanying drawings wherein:

Figure 1 is a plan view of a self-loading and unloading vehicle constructed in accordance with my invention;

Figure 2 is a view in side elevation of the vehicle shown in Figure 1;

Figure 3 is an end view of the vehicle, with certain parts of the loading mechanism therefor broken away;

Figure 4 is an enlarged fragmentary detail longitudinal sectional view, showing certain details of the mechanism for swinging the scoop and boom to a discharge position;

Figure 5 is a fragmentary plan view showing certain details of the crowding mechanism for the scoop and the mechanism for swinging the scoop and boom to a discharge position; and Figure 6 is a fragmentary detail longitudinal sectional view, drawn to substantially the same scale as Figure 4 and showing certain details of the invention not shown in Figure 4.

Referring now in particular to the embodiment of my invention illustrated in the drawings, the vehicle includes generally a frame 10 suitably mounted on a pair of laterally spaced continuous tread traction devices 11, 11 and forming a support for a material carrying body 12 mounted on the upper side of said frame, for tilting movement with respect thereto about an axis extending longitudinally of said frame. A carriage 13 is mounted in said frame between side plates 18, 18 thereof, for movement therealong. Said carriage has a boom 14 pivotally mounted at its forward end, which has a scoop 15 on the forward end thereof, for picking up and elevating material for discharge into said material carrying body.

The side plates 18, 18 of the frame 10 are connected together at their upper ends by a plate 19. Rearward extensions 20, 20 of said side plates have a floor plate 21 connected across the upper ends thereof, which forms an operator's platform at the rear end of said main frame. Said operator's platform has a motor 22 mounted thereon, which forms a drive means for the traction devices 11, 11 and the operating parts of the machine. A seat 23 for the operator is also mounted on said operator's platform, as are the control levers for controlling operation of the machine.

A substantially channel-shaped guide member 25 is secured to the inside of each side plate 18 (see Figure 3). Said guide members on opposite side plates, face each other and form a guide track and support means for the carriage 13. Said carriage, as herein shown, is provided with four lower rollers 26, 26 riding on the lower flanges of said channelled guide members, and is also provided with four upper rollers 27, 27, adapted to engage the lower sides of the upper flanges of said channelled guide members, to prevent upward tilting movement of said carriage with respect to the frame 10.

The boom 14 is pivotally mounted on the carriage 13, on a transverse shaft 29, which is mounted at its ends in said carriage, adjacent the forward end thereof. A boom yoke 30 is pivotally mounted on said shaft and has a pair of parallel spaced boom arms 31, 31 mounted thereon and extending therefrom. The scoop 15 is pivotally connected to the forward ends of said boom arms by means of pivotal pins 33, 33 extending through ears 34, 34, projecting rearwardly from said scoop and interleaving the ends of said arms. The scoop 15 may be of any well known form, adapted to rest on the ground during the gathering operation, and pick up material at its advance end and discharge material from its opposite end into said material carrying body. Abutment means 35, 35 project from said arms into engagement with the rear end of said scoop, to limit pivotal movement thereof and to form a means against which said scoop may react when being forced into the loose material by means of said arms.

The means for pivotally moving the scoop 15 in an upward direction, for the discharge of material, includes a pair of vertically spaced cylinders 36, 36 having pistons 37, 37 therein. Piston rods 39, 39 extend from said pistons and cylinders and are pivotally connected to opposite ends of a pair of oppositely extending lever arms 40, 40, herein shown as being formed integrally with the boom yoke 30, and extending therefrom in diametrically opposite directions. Said arms are herein shown as being bifurcated at their outer ends, to receive the ends of said piston rods between the furcations thereof. Each cylinder 36 is pivotally connected to a rear wall 41 of the carriage 13 by means of a pivotal pin 42 extending through the furcations of a bifurcated bracket 43 and an ear 44, projecting from the head end of said cylinder and interleaved by said bracket. A pump 38 driven from the motor 22, is provided to supply fluid under pressure to said cylinders 36, 36. A fluid storage tank (not shown) and suitable control valves are provided to control the admission and release of fluid under pressure to the head and piston rod ends of said cylinders. Said pump and valves and tank form no part of my present invention so are not herein shown in detail.

During operation of the machine, fluid under pressure is admitted to the piston rod end of the upper cylinder 36 and to the head end of the lower cylinder 36, to swing the boom 14 and scoop 15 in an upward direction, for discharging material from the rear end of said scoop into the material carrying body 12, in an obvious manner.

A pair of laterally spaced fluid pressure cylinders 45, 45, having pistons 46, 46 movable therein, are mounted in said carriage and serve to move said carriage along the frame 10 in the channelled guides 25, 25, to crowd the scoop 15 into the material it is desired to load. Piston rods 47, 47 are extensible from said cylinders and have bifurcated outer ends 49 pivotally connected to lugs 50, 50 extending inwardly from a transverse wall 51 of the main frame 10. Thus, when fluid under pressure is admitted to the head ends of said cylinders, said carriage will be advanced along said main frame, to crowd said scoop into the material it is desired to load, and when fluid under pressure is admitted to the opposite ends of said cylinders, said carriage will be moved in a direction towards the rear end of said main frame, to withdraw the shovel from the material it is desired to load, or to place it in position to pick up a load for the next loading operation. It should here be noted that the side plates 18, 18 of the main frame 10 extend beyond the forward end of the material carrying body 12, and that the carriage 13 is arranged to move the pivotal axis of the boom 14 beyond the forward end of said material carrying body, a distance sufficient for said boom to position the scoop to completely discharge its load from its rear end, into said material carrying body.

The material carrying body 12 is of a rectangular box-like formation with an open top, a flat bottom 53, parallel spaced end walls 54, 54, a fixed side wall 55 extending along one side of said body, and a pivoted side wall 56, pivotally connected at its upper end to opposite side walls 55, 55 of said body, by means of pivotal pins 57, 57 extending through said end walls and tilting side wall.

The pivotal support for the material carrying body 12 on the main frame 10 includes a pair of parallel spaced brackets 59, 59 mounted on the outer side of one side plate 18, adjacent the upper end thereof. Said brackets are herein shown as being of a bifurcated formation and extend along opposite sides of supporting ears 60, 60, which are secured to the bottom of the bottom plate 53 of the body 12 and depend therefrom. Longitudinally extending pins 61, 61 are provided to pivotally connect said supporting ears to said brackets.

The means for tilting the material carrying body 12 includes a pair of longitudinally spaced fluid pressure cylinders 63, 63, longitudinally pivoted to the upper side of the floor plate 19 adjacent one side thereof, on upwardly extending bifurcated support brackets 64, 64. Piston rods 65, 65 are extensible from said cylinders and are pivotally connected at their upper ends to brackets 66, 66, extending forwardly and rearwardly of said body, from opposite ends of the end walls 54, 54, intermediate the ends thereof. The admission of fluid under pressure to the head ends of said cylinders may thus tilt said body about one side of said main frame, in an obvious manner.

The pivoted side wall 56 is held in position to open one side of the material carrying body 12 for the discharge of material, upon tilting movement of said body, by means of linkage connections pivotally connected to angles 67, 67, extending inwardly from opposite ends of said side wall, along the end walls 54, 54. Said linkage connections include a pair of links 68, 69, pivotally connected at vertically spaced points to the inwardly extending leg of the angle 67 (see Figure 3). Said links 68, 69 extend along each end wall 54 and converge from their points of connection to said angles to a connecting member 70, to which they are secured. Said connecting member is pivotally connected to the upper end of a link 71, the lower end of which link is pivotally connected to a bracket 72, secured to the outer side of the main frame 10 and projecting upwardly therefrom.

Thus when fluid under pressure is admitted to the head ends of the cylinders 63, 63, to tilt the material carrying body 12, the links 71, 71 pivotally connected to the links 68, 69 through the connecting members 70, 70, will restrain the side wall 56 from tilting movement as the body 12 is tilted, to open the lower side of said body when in a tilted position and permit the discharge of material therefrom.

It may be seen from the foregoing that a novel form of self-propelled self-loading and unloading vehicle has been provided which is particularly adapted to pick up mined ore and load it into said body in a simplified manner, and to carry said ore to a discharge point, where it may be discharged by tilting movement of said body about one side thereof.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a shovel loading device of the class described, a frame, a carriage movable along said frame, a yoke transversely pivoted on said carriage near the front end thereof and having a boom extending therefrom, a scoop transversely pivoted on the end of said boom, means for positively moving said carriage longitudinally of said frame, to crowd said scoop into the material it is desired to load, and other means for pivoting said scoop and boom in an upward direction for loading material including two arms extending from said yoke in opposite directions, and two oppositely acting fluid pressure cylinders and pistons pivotally mounted on said carriage and having pivotal connection with said arms at diametrically opposite points.

2. In a shovel loading device of the class described, a frame, a carriage movable along said frame, a yoke transversely pivoted on said carriage near the front end thereof and having a boom extending therefrom, a scoop transversely pivoted on the end of said boom, two oppositely acting fluid pressure cylinders and pistons pivotally mounted on said carriage and having operative connection with said yoke at diametrically opposite points, for pivotally moving said scoop and boom in an upward direction for loading material, and a fluid pressure cylinder and piston for moving said carriage longitudinally of said frame for crowding said scoop into the material it is desired to load.

3. In a self-loading and unloading vehicle, a mobile frame having a self-dumping material carrying body mounted thereon, a carriage guided for longitudinal movement along said frame beneath said body, a boom pivotally mounted on the forward end of said carriage, a scoop on the end of said boom, a fluid pressure cylinder and piston extending longitudinally of said frame, and operatively connected with said carriage, for advancing said carriage along said frame and moving said boom beyond the forward end of said body and crowding said scoop into the material it is desired to load, and two fluid pressure cylinders and pistons having operative connection with said boom at opposite sides of the pivotal axis thereof, for pivotally moving said scoop and boom in an upward direction.

4. In a self-loading and unloading vehicle, a mobile frame having a self-dumping material carrying body mounted thereon, a carriage guided for longitudinal movement along said frame beneath said body, a boom pivotally mounted on the forward end of said carriage, a scoop on the end of said boom, two fluid pressure cylinders and pistons having operative connection with said boom at opposite sides of the pivotal axis thereof, for pivotally moving said scoop and boom in an upward direction, and another fluid pressure cylinder and piston having operative connection with said carriage, for advancing said carriage along said frame and moving said boom beyond the forward end of said body, to crowd said scoop into the material it is desired to load and to position said boom to cause material to be discharged directly into said body, when in an elevated position.

ERNEST CRAIG.